April 3, 1928.
J. NICKELS
AUTOMOBILE BUMPER
Filed Sept. 17, 1926
1,664,989
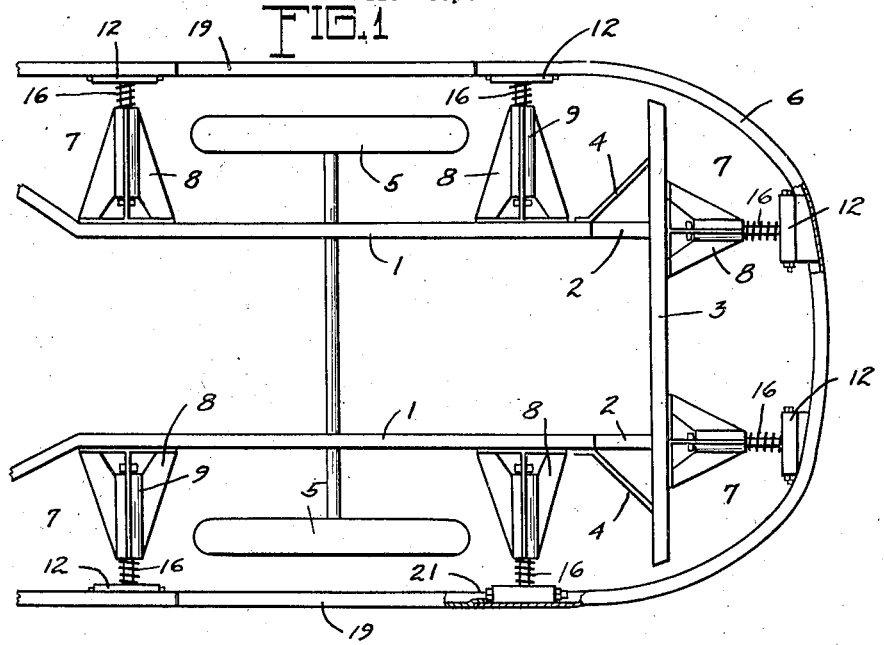
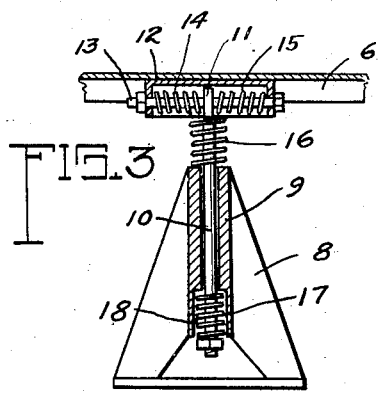
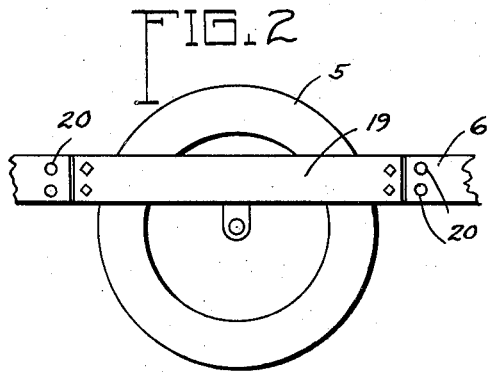
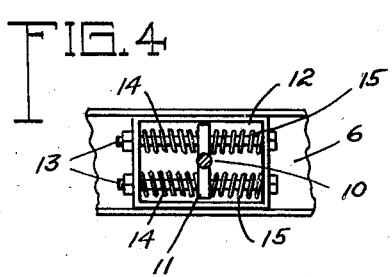
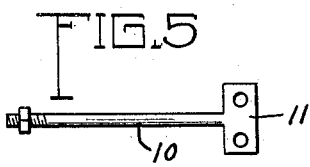
INVENTOR.
James Nickels.
BY Walter N. Haskell,
his ATTORNEY.

Patented Apr. 3, 1928.

1,664,989

UNITED STATES PATENT OFFICE.

JAMES NICKELS, OF SILVIS, ILLINOIS.

AUTOMOBILE BUMPER.

Application filed September 17, 1926. Serial No. 136,106.

My invention has reference to automobile bumpers, and has for its purpose to fully enclose the main frame of the vehicle with an outer frame which is separated from the main frame by a plurality of shock-absorbing elements. These are of a compound character, so that the force of a blow received on one side or end of the bumper frame is dissipated partly by devices near the point of impact and partly by similar devices at a point opposite thereto and remote therefrom. By reason of the multiplicity of devices offering a united resistance to the force of the blow said devices can be made in relatively lighter form, and avoid having a structure of heavier build, which might be too weighty and cumbersome for practical use. The bumper comprises what might be termed a floating frame, adapted to yieldably receive a blow from any direction.

The particular construction, arrangement, and operation of the invention will more fully appear from the following specification, reference being had to the accompanying drawings, in which;

Fig. 1 is a plan view of a fragmentary part of the apparatus, shown in its application to the frame of an automobile.

Fig. 2 is a detail of one of the bumper frame sections 19.

Fig. 3 is a detail of one of the shock-absorbing devices, in horizontal section.

Fig. 4 is an inner face view of one of the casings 12, and parts contained therein.
Fig. 5 is a detail of the bolt 10.

The reference numbers 1 indicate the side pieces of an automobile frame, of usual channel plate construction, provided at one of their ends with extensions 2, to which is fixed a cross-bar 3, further united with the main frame by braces 4. The wheels of the vehicle are positioned as shown at 5, and the device as shown is applicable to either end of the vehicle, the frame 6 being continuous, so as to entirely enclose the car, at the usual height of a bumper from the ground. The frame 6 is separated from the main frame of the car by a plurality of shock-absorbing devices 7 of similar construction, each comprising a bracket 8 secured to the inner plate of the vehicle frame, or to the cross-bar 3, two of said devices being shown at the end of the frame, and two at each side in the fragmentary part of the frame shown in the drawings. Each of said brackets is provided with a central sleeve portion 9, in which is slidable a bolt 10, having a nut on its inner end and a cross-head 11 on its outer end. Fixed to the inner face of the plate 6 are casings 12, one for each of the brackets 8, in which casings are positioned the crossheads 11, so as to have movement longitudinally of the casings. Fixed in the ends of said casings are pairs of bolts 13, passing through openings in the cross-heads 11, and on opposite sides of the cross-head are compression springs 14 and 15, permitting a yieldable movement of the frame 6 in a direction at right angles to the bolt 10.

Interposed between the ends of the brackets 8 and cross-heads 11 are extensile coiled springs 16, encircling the bolts 10, and on the inner ends of said bolts are similar springs 17, in recesses 18 in the brackets 8. Any tendency of the frame 6 to approach the inner frame is resisted by the springs 16, and a tendency of said frames to separate is opposed by the springs 17.

Opposite each of the wheels of the vehicle the bumper frame is provided with a detachable section 19, connected with the frame 6 at each of its ends by means of bolts 20. When it is necessary to get at one of said wheels, as for the purpose of changing the tire thereon, the section 19 adjacent thereto is removed, permitting free access to the wheel. Said sections are preferably provided at their ends with tongues 21, which project on the inner faces of the ends of the frame 6 and are bolted thereto. By this means the sections 19 are flush with the main part of said frame.

It will be evident that upon the bumper frame receiving the impact of a blow there will be a multiple spring action to off-set the force thereof. In case of a blow at the end of the frame not only will the springs 16 at that end receive the shock but there will be a reaction on the springs 17 at the opposite end of the vehicle, and it will be further distributed over a number of the springs 14 in the sides of the frame. In case of a blow on one side of the bumper there will be a compression of one or more of the springs 16 in the vicinity thereof and a similar compression of one or more of the springs 17 on the other side of the automobile. Any blow that the bumper may receive will therefore be met with a multiplied amount of yieldable resistance, spread over the entire frame, instead of all being received at one point. As before mentioned, this arrangement permits of the use of a more delicate system of shock absorbing devices, and at the same time presents a more effective resistance to the blow.

The ends of the cross-pieces 3 are beveled to correspond with the shape of the bumper frame, and in the event of the springs being completely compressed the ends of said cross-pieces act as stops, preventing further movement of the bumper.

The end pieces of the bumper frame may be varied as to form, and other changes can be made in the construction and arrangement of the device, without departing from the spirit of the invention, as set out herein.

What I claim, and desire to secure by Letters Patent, is;

1. In a device of the class described, an inner frame, an outer frame encircling the same, and provided with removable sections, and pairs of oppositely acting shock-absorbing devices uniting said frames.

2. In a device of the class described, a shock absorbing device comprising a bracket adapted for attachment to a relatively stationary frame, a casing adapted for attachment to an auxiliary frame, a bolt slidable in said bracket and having a head movable in said casing, coiled springs on the ends of said bolts capable of exerting force in opposite directions, and springs in said casing bearing on opposite sides of the bolt head, and capable of exerting force in opposite directions.

In testimony whereof I affix my signature.

JAMES NICKELS.